(12) United States Patent
Bentz et al.

(10) Patent No.: US 6,530,796 B2
(45) Date of Patent: Mar. 11, 2003

(54) PLUG-IN MODULE FOR ADJUSTING MOTOR

(75) Inventors: Willy Bentz, Sachsenheim (DE); Heiko Buss, Buehl (DE); Martin Hager, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/800,549

(22) Filed: Mar. 7, 2001

(65) Prior Publication Data

US 2001/0022050 A1 Sep. 20, 2001

(30) Foreign Application Priority Data

Mar. 8, 2000 (DE) .......................................... 200 04 338

(51) Int. Cl.⁷ ............................................... H01R 13/62
(52) U.S. Cl. ...................................... 439/297; 439/248
(58) Field of Search ........................ 439/34, 76.1, 246, 439/248, 252, 297, 736

(56) References Cited

U.S. PATENT DOCUMENTS 5,112,235 A * 5/1992 Enomoto et al. ............. 439/83
5,306,169 A * 4/1994 Fukushima et al. ......... 439/248
5,984,695 A * 11/1999 Riehl et al. ................ 439/76.1
6,249,068 B1 * 6/2001 Knopp ........................ 310/71
6,269,539 B1 * 8/2001 Takahashi et al. ............ 29/883

FOREIGN PATENT DOCUMENTS

DE      197 46 518 A1    4/1999

* cited by examiner

Primary Examiner—Lynn D. Feild
Assistant Examiner—Michael C. Zarroli
(74) Attorney, Agent, or Firm—Michael J. Striker

(57) ABSTRACT

A plug-in module for adjusting motors of electric-motor operated window openers in a motor vehicle has at least one plug insertable in a transmission housing of a window lifter. A plug housing is composed of a plastic material with partially injection molded contact elements and motor contacts. The motor contacts have freely located connection portions which have an end-side contact portion for contacting with an associated countercontact and also a spring portion which supports the contact portion and allows a position orientation of the contact portion to the countercontact.

4 Claims, 1 Drawing Sheet

PLUG-IN MODULE FOR ADJUSTING MOTOR

BACKGROUND OF THE INVENTION

The present invention relates to an plug-in module for adjusting motors, in particular for electric-motor operated windows to be used in a motor vehicle.

Such an insertion module is disclosed for example in German patent document DE 197 46 518. The insertion module is formed with a plug composed of a plug housing of synthetic plastic material and contact elements which are injection molded in it, and also with motor contacts. The plug housing further has a receptacle in which a support element for electronic components is inserted and at least indirectly is in electrical connection directly with the contact elements and motor contacts.

The contact elements with freely located end portions extend into a receiving shaft which is limited by a circumferential collar for an accurate position association of the end portions with a counterplug insertable into the receptacle. The motor contacts extend with the freely located end portions, without a guiding element to surround them, in form of tongues outwardly beyond a rear wall of the plug housing.

When the plug-in module is inserted in a housing, in particular in a transmission housing of a window opener, said position association of the motor contacts with the associated counter contacts becomes difficult because of the mounting gap of the insertion module, and the danger of damages of the motor contacts with the possible loss of operation of the insertion module exists.

SUMMARY OF THE INVENTION

Accordingly, it is an object of the present invention to provide an plug-in module for adjusting motors of the above mentioned general type, which avoids the disadvantages of the prior art.

In keeping with these objects and with others which will become apparent hereinafter, one feature of present invention resides, briefly stated, in an insertion module which is provided with a plug whose motor contacts on the freely located end portions are provided each with a spring portion which faces the synthetic plastic housing of the plug and with a contact portion on the end side.

Thereby the motor contacts can be deviated in a housing in the position transverse to the mounting direction of the insertion module. This facilitates contacting with the associated counter contacts and eliminates alignment problems, so that a damage of the motor contacts which can lead to operational loss of the plug-in module is avoided.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
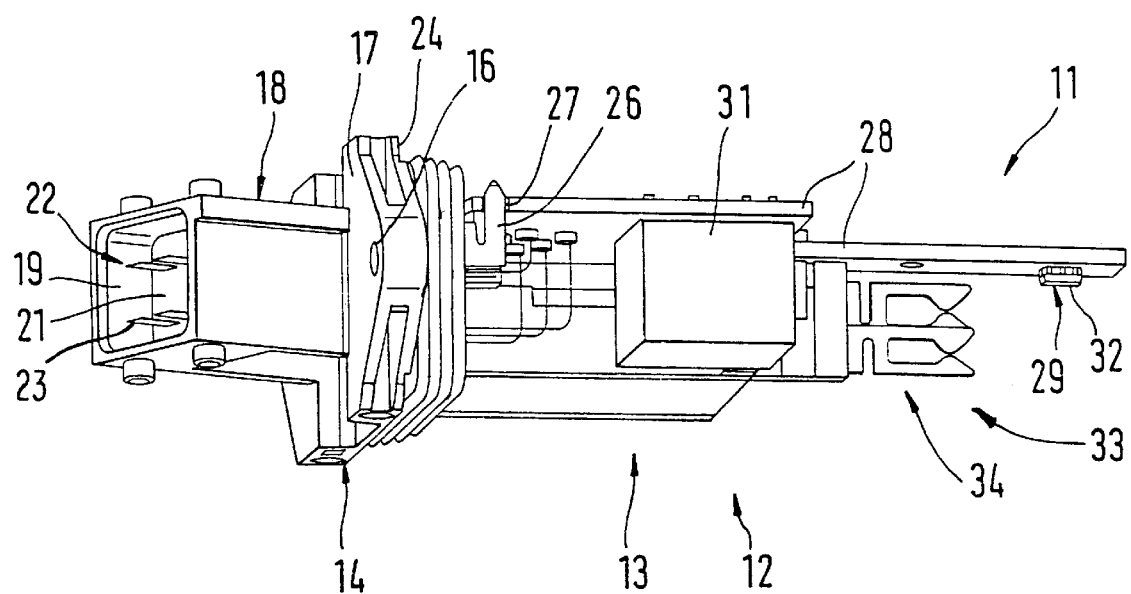
FIG. 1 is a perspective side view of an plug-in module in accordance with the present invention.

Plug-in module for adjusting motor, for example for an electric-motor operated window opener is shown in FIG. 1. It includes a plug 12 with a plug housing 13 composed of synthetic plastic material. The plug housing 13 has a central part formed as a plate-shaped receptacle 14 with mounting openings 16 for fixing the plug and the plug module 11 in a not shown housing, for example in a transmission housing of a window opener.

A parallelopiped-shaped connection body 18 extends from an end side 17 of the receptacle 14. On its free end it has a circumferential thin-walled collar 19. The collar 19 surrounds a connection shaft 21, in which the freely located first end portion 22 extends from the contact element 23. The latter is partially injection molded in the plug housing 13. The first end portion 22 is provided for contacting with a not shown connecting plug, which is inserted in the connection shaft 21. Therefore the collar 19 is guided first to provide an accurate position association to the first end portion 22.

Second end portions 26 of the contact element 23 extend from a rear side 24 of the receptacle 14. They are guided in angled contact openings 27 of a printed circuit board 28 and are contacted in a material-connection way. The printed circuit board 28 is supported in a not shown manner in a receptacle 14 and extends horizontally from the rear side 24. The printed circuit board 28 forms a carrier element which carries electronic components 29, for example, a relay 31 or a sensor 32. The sensor 32 can be a Hall effect sensor. It is arranged on the printed circuit board 28 in the form of an SMD, so that with an inserted plug-in module 11, for example in a transmission housing of a window opener, it is coupled with ring magnets mounted there.

Figure 2:
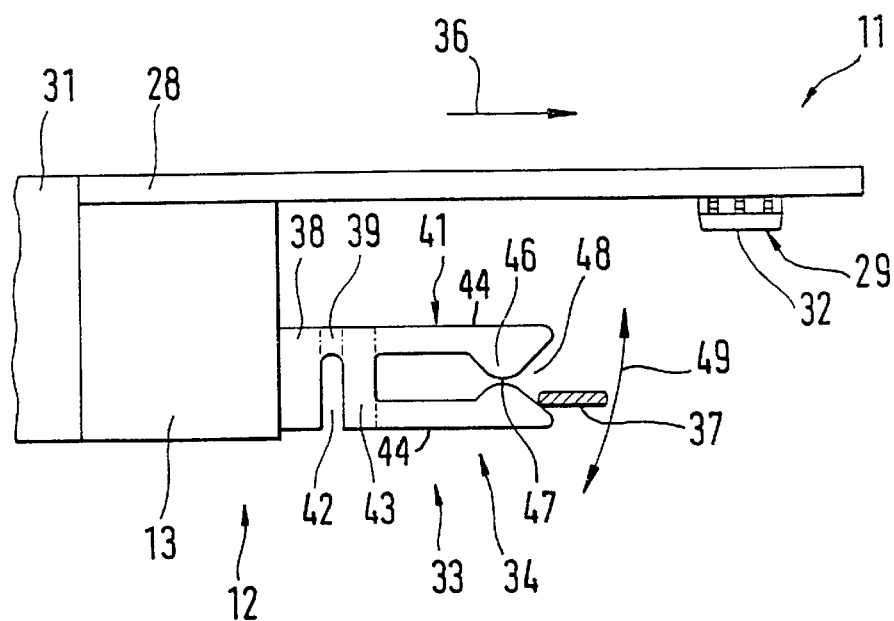
FIG. 2 is a side view of a part of the plug-in module with an inserted motor contact.

Motor contacts 33 are electrically connected in a not shown manner with the printed circuit board 28, at least indirectly. The motor contacts 33 are injection-molded in the plug housing 13. Two freely located connection portions 34 of the motor contacts 33 are shown in FIG. 1. They extend perpendicular to the mounting direction which is identified with an arrow 36 in FIG. 2 and arranged so that they are offset and horizontal to the plane of the drawing. The electronic input signals of the plug-in module 11 are transmitted through the connection portion 34 to a adjusting motor. In FIG. 2 only a countercontact 37 is shown symbolically to identify the adjusting motor.

With the insertion, of the plug-in module 11 in the not shown housing, in which the adjusting motor is rigidly supported, the motor contact 33 meet the associated stationary counter contacts 37. In order to provide an exact position association between the motor contact 33 and the countercontacts 37 despite the size tolerances which are unavoidable because of the movement gap between the plug-in module 11 and the housing during an insertion process, the motor contacts 33 are designed so that they can perform position changes in a sufficient range transversely to the mounting direction of the plug-in module 11.

FIG. 2 shows in detail one connection portion 34 of an individual motor contact 33. After the exit from the plug housing 11, it has with regard to the direction of the possible position change transversely to the mounting direction, a wide foot portion 38, a small spring portion 39, and a wide contact portion 41.

The spring portion 39 is formed by a slot 42 transversely to the mounting direction. It subdivides the connection portion 34 which originally is formed in the same width, into the portions 38, 39, and 41.

The contact portion 41 has a base web 43 which extends transversely to the mounting direction. A spring web 44 projects at one side and is oriented in the mounting direction. The spring webs 44 which initially extend parallel relative to one another, in a further continuation are provided in a symmetrical arrangement with inwardly oriented beads 46. Between the beads 46, a narrow contact location 47 is formed. The free distance between the beads 46 in the region of the contact location 47 is smaller than the extension of the countercontacts 37 transversely to the mounting direction. Thereby the spring web 44 springs somewhat back, when the counter contact 37 passes the contact location 47.

For providing an easier guidance of the counter contact 37 to the contact location, the distance between both spring webs 44 increases from the contact location 47 to the free ends, so that a contact funnel is formed.

When the counter contact 37 as shown in FIG. 2 extends off-center on the contact location 47, the countercontact meets the contact funnels 48 off center. Since the thickness of the spring web 44 transversely to the mounting direction and the thickness of the base web 43 in the mounting direction is correspondingly greater than the thickness of the spring portion 39 transversely to the mounting direction, the connection portion 34 in the spaced portion 39 yields so that the spring portion 39 can be considered as a spring point, from which a turning movement of the contact portion 41 along the direction of a double arrow 49 is performed, until the countercontact 37 can be inserted into the contact point 47.

Thereby a tolerance compensation between each motor contact 33 and the associated countercontact 37 is possible. Therefore an operation loss of the plug-in module 11 in the case of a not-aligned guidance of the motor contact 33 to the associated countercontacts 37 by damaging of the contact 33, 37, is avoided.

It will be understood that each of the elements described above, or two or more together, may also find a useful application in other types of constructions differing from the types described above.

While the invention has been illustrated and described as embodied in plug-in module for adjusting motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A plug-in module for adjusting motors of electrically operated windows in a motor vehicle, the plug-in module comprising at least one plug insertable in a transmission housing of a window lifter along a mounting direction; a plug housing composed of a plastic material with injection molded contact elements and motor contacts, said motor contacts having connection portions which have an end-side contact portion for contacting with an associated counter-contact and also a spring portion which supports the contact portion and allows a position orientation of said contact portion to said countercontact, a connection portion which has a constant material thickness, said contact portion having a base web from which at one side two opposite spring webs extend and at an end side of said contact portion, a contact point is formed, and on the other side is connected with said spring web, wherein said spring web has a thickness transverse to said mounting direction, wherein said spring web is smaller both than a thickness of said base web in said mounting direction and also than a thickness of each spring web between its connection to its base web and said contact location.

2. An plug-in module as defined in claim 1, wherein said spring portion has a lower bending strength than said contact portion.

3. A plug-in module as defined in claim 1, wherein said contact location is formed by opposite beads which extend each from said spring web and are oriented toward one another so that a distance between said beads is smaller than an extension of said countercontact transversely to said mounting direction.

4. A plug-in module as defined in claim 3, wherein said spring web forms a contact funnel between said contact location and its free ends.

\* \* \* \* \*